United States Patent
Perkins et al.

(10) Patent No.: US 9,727,976 B1
(45) Date of Patent: Aug. 8, 2017

(54) GEOSPATIAL-TEMPORAL SEMANTIC GRAPH REPRESENTATIONS OF TRAJECTORIES FROM REMOTE SENSING AND GEOLOCATION DATA

(71) Applicant: Sandia Corporation, Albuquerque, NM (US)

(72) Inventors: David Nikolaus Perkins, Albuquerque, NM (US); Randolph Brost, Albuquerque, NM (US); Lawrence P. Ray, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 4 days.

(21) Appl. No.: 15/159,384

(22) Filed: May 19, 2016

Related U.S. Application Data

(63) Continuation-in-part of application No. 14/848,169, filed on Sep. 8, 2015, and a continuation-in-part of application No. 14/848,165, filed on Sep. 8, 2015.

(51) Int. Cl.
*G06K 9/00* (2006.01)
*G06T 7/20* (2017.01)
(Continued)

(52) U.S. Cl.
CPC ...... *G06T 7/2026* (2013.01); *G06F 17/30241* (2013.01); *G06K 9/0063* (2013.01);
(Continued)

(58) Field of Classification Search
CPC .. G06K 9/00637; G06K 9/469; G06K 9/6267; G06K 9/0063; G06T 7/004;
(Continued)

(56) References Cited

U.S. PATENT DOCUMENTS

| | | | |
|---|---|---|---|
| 7,711,146 B2 * | 5/2010 | Tu | G06K 9/00295 348/143 |
| 9,076,259 B2 * | 7/2015 | Hourie | G06F 17/30241 |

(Continued)

OTHER PUBLICATIONS

Ma, Shuo, Yu Zheng, and Ouri Wolfson. "T-share: A large-scale dynamic taxi ridesharing service." Data Engineering (ICDE), 2013 IEEE 29th International Conference on. IEEE, 2013.*

(Continued)

*Primary Examiner* — Jonathan S Lee
(74) *Attorney, Agent, or Firm* — Medley, Behrens & Lewis, LLC

(57) ABSTRACT

Various technologies for facilitating analysis of large remote sensing and geolocation datasets to identify features of interest are described herein. A search query can be submitted to a computing system that executes searches over a geospatial temporal semantic (GTS) graph to identify features of interest. The GTS graph comprises nodes corresponding to objects described in the remote sensing and geolocation datasets, and edges that indicate geospatial or temporal relationships between pairs of nodes in the nodes. Trajectory information is encoded in the GTS graph by the inclusion of movable nodes to facilitate searches for features of interest in the datasets relative to moving objects such as vehicles.

20 Claims, 5 Drawing Sheets

(51) Int. Cl.
*G06F 17/30* (2006.01)
*G06K 9/46* (2006.01)
*G06T 11/20* (2006.01)

(52) U.S. Cl.
CPC ............ *G06K 9/469* (2013.01); *G06T 7/2033* (2013.01); *G06T 11/206* (2013.01); *G06T 2207/30241* (2013.01)

(58) Field of Classification Search
CPC ... G06T 7/2026; G06T 7/2033; G06T 11/206; G06T 2207/30241; G06F 17/30241
See application file for complete search history.

(56) References Cited

U.S. PATENT DOCUMENTS

| | | | | |
|---|---|---|---|---|
| 2005/0265582 | A1* | 12/2005 | Buehler | G06K 9/00335 382/103 |
| 2010/0046842 | A1* | 2/2010 | Conwell | G06F 17/30265 382/218 |
| 2013/0063489 | A1* | 3/2013 | Hourie | G06F 17/30241 345/643 |

OTHER PUBLICATIONS

Brost, et al., "A Computational Framework for Ontologically Storing and Analyzing Very Large Overhead Image Sets", In 3rd ACM SIGSPATIAL International Workshop on Analytics for Big Geospatial Data (BigSpatial), 2014, pp. 1-10.
Fekete, et al., "Geometric Hitting Set for Segments of Few Orientations", In Approximation and Online Algorithms, Springer International Publishing, 2015, pp. 1-2.
Ray, et al., "Jackpine: A Benchmark to Evaluate Spatial Database Performance", In Data Engineering (ICDE), 2011 IEEE 27th International Conference on IEEE, 2011, 12 pages.
Doan, et al., "Learning to Map Between Ontologies on the Semantic Web", In Proceedings of the 11th International Conference on World Wide Web, ACM, May 7, 2002, 12 pages.
Passino, et al., "Aspect Coherence for Graph-Based Semantic Image Labelling", May 25, 2009, 29 pages.
Strip, David, "Source Agnostic Fusion Through Geospatial/Temporal Semantic Graphs", Sep. 26, 2012, 26 pages.
Brost, et al., "Geospatial-Temporal Remote Sensing Analysis Using Semantic Graphs", Project No. SL12-DeltaSpaceTime-PD06, Jan. 16, 2013, 1 page.
Watson, et al., "Verification, Monitoring, and Remote Detection (VMRD2012) Joint Program Review Meeting", In Sandia Unclassified Unlimited Release, May 15, 2012, 31 pages.
Brost, Randy C., "A Computational Framework for Ontologically Storing and Analyzing Very Large Overhead Image Sets", In Sandia Unclassified Unlimited Release UUR SAND 2014-19280C, Nov. 4, 2014, 86 pages.
Brost, et al., "Thoughts on Multi-Modality Data Analysis", In Sandia Unclassified Unlimited Release UUR SAND 2015-1124C, Mar. 2, 2015, 10 pages.
Brost, Randy C., "Nuclear Weaponization and Material Production Detection Review Meeting", In Sandia Unclassified Unlimited Release UUR SAND 2014-2656C, Apr. 29, 2014, 44 pages.
Brost, et al., "Computing Quality Scores and Uncertainty for Approximate Pattern Matching in Geospatial Semantic Graphs", In Sandia Power Point Presentation at Conference on Data Analysis, SAND 2014-1753P, 2014, 1 page.
Brost, Randy C., "Geospatial-Temporal Semantic Graphs for Remote Sensing Data Analysis", In Sandia Unclassified Unlimited Release UUR SAND 2015-5935 PE, Jul. 23, 2015, 78 pages.
Brost, et al., "LDRD Final Report: First Application of Geospatial Semantic Graphs to SAR Image Data", In Sandia Report SAND2013-0724, Jan. 2013, 65 pages.
Brost, et al., "Image-Based Algorithms—Semantic Graph Algorithms", In Sandia Unclassified Unlimited Release UUR SAND 2015-2228C, Apr. 29, 2015, 1 page.
"Pattern Analytics to Support High-Performance Exploitation and Reasoning", In Sandia Power Point on Laboratory Directed Research and Development Data-to-Decision Grand Challenge, SAND 2013-3298A, Apr. 25, 2013, 3 pages.
Brost, et al., "Approximate Pattern Matching Under Uncertainty in Geospatial Semantic Graphs", In Sandia Power Point on Panther DA Uncertainty, Mar. 7, 2014, 35 pages.
Watson, et al., Encoding and Analyzing Aerial Imagery Using Geospatial Semantic Graphs, In Sandia Report SAND2014-1405, Feb. 2014, 30 pages.

* cited by examiner

GEOSPATIAL-TEMPORAL SEMANTIC GRAPH REPRESENTATIONS OF TRAJECTORIES FROM REMOTE SENSING AND GEOLOCATION DATA

RELATED APPLICATIONS

This application is a continuation-in-part of U.S. patent application Ser. No. 14/848,169, filed on Sep. 8, 2015, and entitled "SEARCHES OVER GRAPHS REPRESENTING GEOSPATIAL-TEMPORAL REMOTE SENSING DATA". This application is additionally a continuation-in-part of U.S. patent application Ser. No. 14/848,165, filed on Sep. 8, 2015, and entitled "REPRESENTATION OF ACTIVITY IN IMAGES USING GEOSPATIAL TEMPORAL GRAPHS". The entireties of these applications are incorporated herein by reference.

STATEMENT OF GOVERNMENTAL INTEREST

This invention was developed under Contract DE-AC04-94AL85000 between Sandia Corporation and the U.S. Department of Energy. The U.S. Government has certain rights in this invention.

BACKGROUND

Remote sensing data, including high-resolution imagery from aircraft and spacecraft-based surveillance and imaging systems, and geolocation data, including time-stamped latitude-longitude data from GPS, AIS, and other systems, is now being used for purposes ranging from meteorological observation to military surveillance. Large remote sensing and geolocation datasets are being collected that represent information about large geographical regions with many different features of interest. Current machine-assisted search techniques primarily rely on defining searches over particular image pixel characteristics to identify these features within a larger dataset. These techniques often fail to capture semantically relevant patterns in the data, especially over time.

SUMMARY

The following is a brief summary of subject matter that is described in greater detail herein. This summary is not intended to be limiting as to the scope of the claims.

Various technologies for locating features of interest in remote sensing and other geolocation datasets relative to one or more object trajectories by searching over a geospatial-temporal semantic (GTS) graph are described herein. In an example, a computing system constructs a computer-implemented GTS graph representation of objects and other features of interest in a region based upon remote sensing data and geolocation data such as, for example, GPS data or maritime automatic identification system (AIS) data. The GTS graph includes nodes and graph edges that couple nodes, where nodes of the GTS graph can represent features of interest such as buildings, roads, bodies of water, vehicles, events of interest, etc. Nodes are encoded with various attributes describing characteristics of the features they represent. The graph edges represent relationships between nodes, where the edges are either undirected or directed edges. These edges represent geospatial, temporal, change semantics, and/or ancestry relationships between nodes. Examples include geodetic distance, temporal distance, and removal or construction of a building. The GTS graph can include a node that corresponds to a trajectory, where such node describes a moving object, such as a vehicle. The trajectory can comprise a plurality of locations each associated with a particular time over some window of time. The trajectory can be derived from geolocation data.

The computing system can perform searches over the GTS graph to identify features of interest in the remote sensing and geolocation data. Searches over the GTS graph can identify features of interest by comparison of search query parameters to nodes and edges of the GTS graph. Search queries over the GTS graph relative to the moving object can be defined with respect to a particular period of time, and distance edges from the node representing the moving object can be calculated based upon the period of time (or an additional period of time or duration). Thus, encoding nodes with trajectories enables searches over the GTS graph to identify moving features of interest based upon times for which the features of interest satisfy search constraints.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
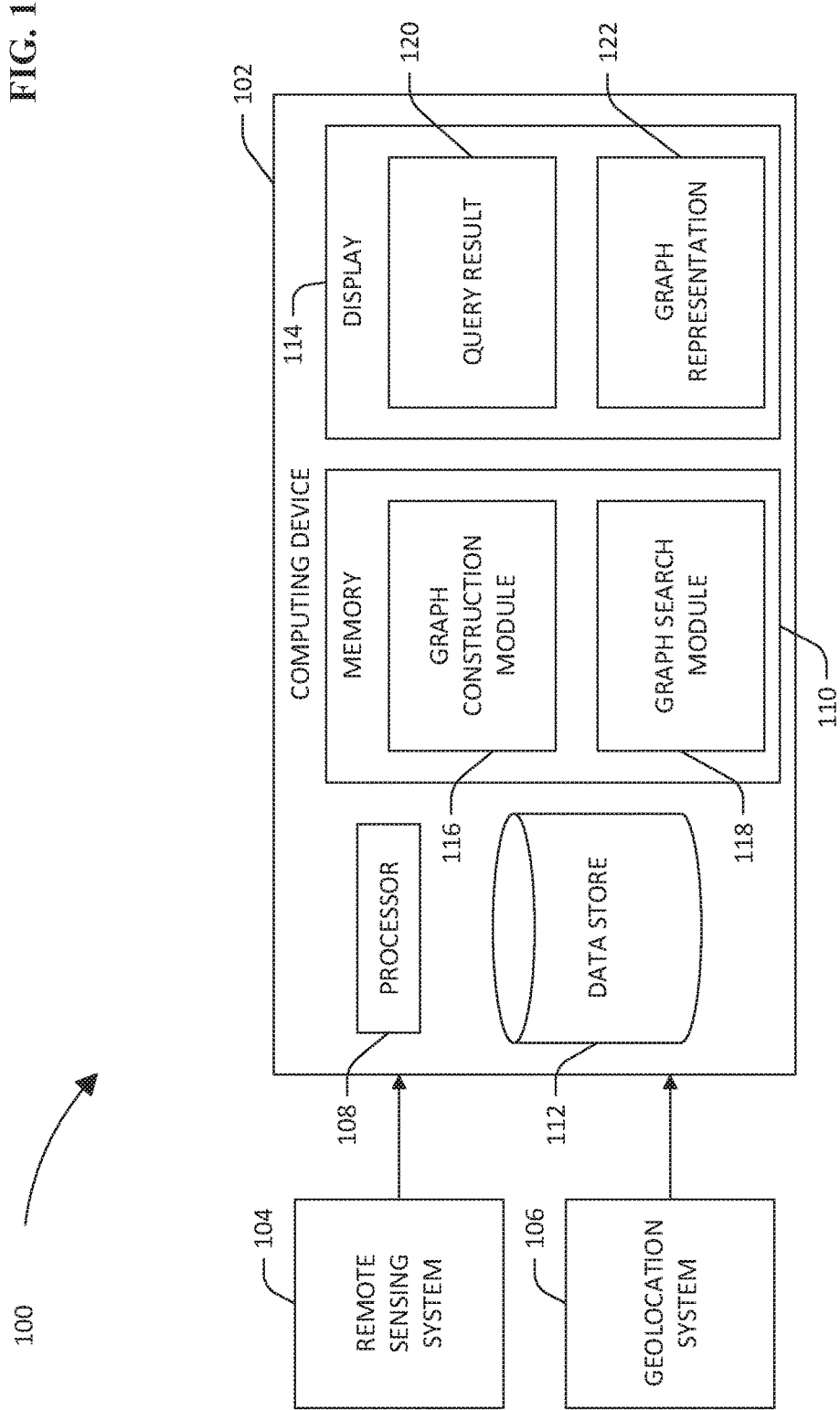
FIG. 1 is a functional block diagram of an exemplary system that facilitates analysis of trajectory features of interest by searching over a GTS graph.

Various technologies pertaining to analysis of trajectory features of interest in remote sensing and geolocation datasets are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component", "module", and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Additionally, as used herein, the term "exemplary" is intended to mean serving as an illustration or example of something, and is not intended to indicate a preference.

With reference to FIG. 1, an exemplary system 100 that facilitates analysis of trajectory features in remote sensing and geolocation data by searching over GTS graphs is illustrated. The system 100 includes a computing device 102 that receives data from a remote sensing system 104 and a geolocation system 106. The computing device 102 comprises a processor 108, memory 110, a data store 112, and a display 114. The computing device 102 can store data received from the remote sensing data system 104 and the geolocation data system 106 in the data store 112 for later retrieval. The memory 110 comprises a graph construction module 116 that constructs GTS graphs based upon data received by the computing device 102 from the remote sensing system 104 and the geolocation system 106. The memory 110 further comprises a graph search module 118 that searches the GTS graphs generated by the graph construction module 116, responsive to receipt of a search query, in order to identify features of interest in the remote sensing data or the geolocation data. Features of interest can be substantially any information relative to geospatial or temporal relationships between objects or other features described by the remote sensing or geolocation data that can be represented in a GTS graph. Responsive to executing a search over a GTS graph, the computing device 102 can present one or more query results 120 on the display 114. The query result 120 can be, for example, a subgraph portion of the full GTS graph that matches the query. In another example the query result 120 can be an indication of a location of a feature of interest matching the search query. The computing device 102 can also present a representation 122 of either the full GTS graph or a subgraph of the full graph on the display 114.

The GTS graph includes nodes and edges that couple nodes. The nodes represent objects or other features in the scene, and undirected edges between nodes represent symmetric relationships, such as the distance between disjoint objects, the overlap area common to overlapping objects, or that the objects are immediately adjacent to one another in the scene. The GTS graph also may comprise directed edges between nodes, representing asymmetric relationships such as "is north of" or "is half size of." Thus, a directed edge pointing from a first node to a second node can indicate that an object represented by the first node is "north of" an object represented by the second node. The graph construction module 116 can cause a graph representation 122 to be presented on the display 114 for user examination and review, wherein the graph representation 122 may be a pictorial graph, a text-based presentation of the nodes and their associated edges, etc.

The computing device 102 can generate GTS graphs of objects and other features in a scene or a region responsive to receiving data from the remote sensing system 104 and the geolocation system 106. The geolocation data received by the computing device 102 from the geolocation system 106 comprises data indicative of a plurality of locations of a moving object over a period of time. For example, the geolocation data can be timestamped latitude/longitude coordinates corresponding to a GPS receiver mounted on a vehicle. The remote sensing data received by the computing device 102 from the remote sensing system 104 is indicative of various features in a region or scene depicted in the remote sensing data. In one example, the data received from the remote sensing system 104 can include remote sensing images generated by the remote sensing system 104 based upon data from one or more sensors. In another example, the data received from the remote sensing system 104 can include posterized classification images indicative of one or more ground cover categories (e.g., buildings, vegetation, roads, etc.) of areas in a scene.

Further, the graph construction module 116 can be configured to generate a posterized classification image based upon remote sensing data received from the remote sensing system 104, whereupon the graph construction module 116 generates a GTS graph based upon such classification image. The remote sensing data may be one or several images comprising data that can be used to generate a suitable classification image of the scene. In an example, the remote sensing data includes RGB+IR imagery, LiDAR or digital surface model (DSM) data, and GIS road data to provide a detailed model of land cover of the scene that is capable of distinguishing between buildings, trees, low vegetation such as grass and shrubs, roads, other pavement, bare earth, and water. DSM data refers to a model of heights of top surfaces, measured either in absolute elevation or relative to ground level. Thus, DSM data broadly refers to any suitable data included in a height model of a scene. In the example, LiDAR and/or DSM data can be used by the graph construction module 116 to construct a normalized digital surface model (nDSM) of the scene showing elevation of objects in the scene above ground. Objects in the scene can then be categorized as either "tall" or not relative to the ground, where tall refers to objects the size of trees or buildings (e.g., 2 meters or more). Among tall objects, trees and buildings can be differentiated using a normalized difference vegetation index (NDVI) computed from the RGB+IR image by the graph construction module 116. Among the "short" objects, low vegetation can also be identified using the NDVI. Remaining objects, such as dirt, pavement, and water may be differentiated based on spectral, geometric, and other contextual properties. Among the set of objects classified as pavement, roads can be distinguished using GIS road data. While the example described above provides one approach to generating posterized classification images, it is to be understood that any other input imaging data, for example SAR data, may be used to generate classification images using any image processing methods capable of distinguishing among different object types at a high level.

Responsive to receiving remote sensing data from the remote sensing system 104 for multiple times corresponding to the same scene (e.g., with associated time information for each image) or geolocation data from the geolocation system 106 for multiple times corresponding to a same object, the computing device 102 can generate GTS graphs that incorporate data and representations of geospatial relationships and temporal change in the scene from the time at which first data was collected to the time at which second data was collected. Temporal changes can be changes in the position of an object depicted in a remote sensing image or geolocation data, a change in size or shape of a region in a classification image, a change in the ground cover category of a region in a classification image, etc. The graph construction module 116 can generate pure temporal graphs, pure geospatial graphs, or GTS graphs that encode both geospatial and temporal change relationships by processing data received from the remote sensing system 104 or the geolocation system 106. The graph construction module 116 can also generate GTS graphs by processing data from multiple geospatial graph representations of the scene.

A GTS graph includes nodes that represent various features of interest described by the remote sensing data or the geolocation data. These features of interest can include objects (e.g., buildings, roads, vehicles, etc.), contiguous regions of a similar ground cover category (e.g., lakes, open grass fields, open paved areas such as parking lots, etc.), or transient events, occurrences, or objects (e.g., a traffic accident, cloud cover, a temporary museum exhibit, etc.). The nodes of the graph are assigned data indicative of various attributes of the objects they represent. For example, a node representing a body of water can be assigned data indicative of a size of the body of water, its geometry, its depth, etc. In another example, a node representing a building can be assigned data indicative of characteristics such as height, address, ownership, etc. In still another example, a node representing a moving object (e.g., a vehicle) can be assigned data indicative of a trajectory of the moving object, the trajectory comprising a plurality of locations of the moving object over a window of time.

The nodes in a GTS graph can be assigned values from numerous sources. Exemplary values include positional values ascertained from imagery (e.g., optical imagery, radar imagery, etc.). Further, nodes in a GTS graph can arise from and be assigned values from external sources, such as online maps (e.g., latitude/longitude coordinates), identities (e.g., business names), street addresses, and so forth. With more particularity, external sources may be non-image sources, such as a database that comprises rows and columns. For instance, a database can include a plurality of rows, wherein each row comprises an identity of a business, a corresponding street address, latitude/longitude coordinates, and potentially other metadata. The GTS graph can include nodes that are respectively representative of rows of the database, where each node is assigned values found in entries in a corresponding database row. In another example, each row in the database can comprise an identity of a vehicle or other moving object, latitude/longitude coordinates, and a corresponding timestamp.

Nodes are also assigned data indicative of certain high-level classifications that define a type for the respective objects they represent. These node types can include durable nodes, which represent features that are generally persistent in location over time, (e.g., buildings and terrain features); ephemeral nodes, which represent features that, while typically associated with a single location, generally last for only a limited period of time (e.g., traffic accidents and other transient events); and movable nodes, described in greater detail below, which represent features that, while persistent in the underlying remote sensing or geolocation data over time, are not generally associated with only a single location over time (e.g., vehicles).

The graph construction module 116 also constructs edges of the graph that connect respective pairs of nodes and that are assigned data indicative of a relationship between the features represented by the nodes. The edges comprise undirected edges that are assigned data indicative of a symmetric relationship between their connected nodes, and directed edges that are assigned data indicative of an asymmetric relationship between their connected nodes. For example, an undirected edge can be assigned data identifying a distance between features represented by the nodes that it connects. In another example, a directed edge with a direction going from a first node to a second node can be assigned data indicating that a region or area corresponding to the first node changed one or more characteristics.

In an embodiment, a stored graph of a remote sensing dataset that includes some or all distance edges between nodes is kept in the data store 112 to be searched at a later time responsive to receipt of a search query. It is to be understood, however, that the geospatial graph construction module 116 need not construct a complete graph of features in the remote sensing data or the geolocation data. In a particular example, when image datasets are very large, for example if an entire city is depicted in an image, it may be computationally impractical to construct all possible graph edges between nodes representing objects in the image. A subset of graph edges can be computed by the geospatial graph construction module 116 to construct a partial graph responsive to receiving a graph search query defining particular nodes or relationships of interest. For example, if a user is interested in determining the shortest distance to a road from every structure in an image, the graph construction module 116 need not construct edges between grassy fields and bodies of water. Further, in the same example, constructing the edges between every road segment and every structure might not be necessary to solve the problem if it is known that roads beyond a certain maximum distance from structures are of no interest. In another example, the graph construction module 116 can generate a complete node representation of the remote sensing data and geolocation data, which representation can be stored in the data store 112. The graph construction module 116 can then construct graph edges on demand at a later time, responsive to receiving graph search queries from users, and can update the graph with the computed edges, so that they may be re-used by later queries without recomputation. The construction of a geospatial graph can therefore be an iterative process in which the graph is continually updated in response to search queries.

The durable and ephemeral nodes in a GTS graph are encoded with a time attribute by the graph construction module 116. This attribute allows information about when an object was seen to exist or not exist at a location to be encoded into the graph itself. The time attribute for durable nodes can be represented by two ordered pairs with the following representation scheme:

$$t_{node}=(t_{last\ absent}, t_{first\ seen}] [t_{last\ seen}, t_{first\ absent})$$

The first element, $t_{last\ absent}$, is the time of the latest observation in which the node was seen not to exist. If there is no such observation, i.e., if the node appears in the first observation, this element is set to $-\infty$ since as far as can be told from available data the corresponding object was there from the beginning of time. The second element, $t_{first\ seen}$, is the time of the earliest observation when the node was seen at the location corresponding to the node. The third element, $t_{last\ seen}$, is the time of the latest observation in which the node was seen. The final element, $t_{first\ absent}$, is the time of the first observation after the node was seen in which the node was observed to have either changed or disappeared. If there has not been such an observation, the value is set to +∞ since as far as can be determined the node will continue to persist forever. Since ephemeral nodes are not expected to persist through time like durable nodes are, they are instead associated with a chronology [$t_{min}$, $t_{max}$] describing the range of time when the ephemeral object may have appeared.

The graph search module 118 conducts user-defined searches for particular features of interest over GTS graphs generated by the graph construction module 116. In an embodiment, responsive to receiving a graph search query from a user, the graph search module 118 causes the graph construction module 116 to generate a search graph derived from a larger stored graph based on the parameters of the query. In the exemplary embodiment, the search graph is constructed based at least in part on node attributes defined in the user query. For example, if a search query asks for all structures with nearby paved parking lots, the graph search module 118 can cause the graph construction module 116 to construct a search graph of the larger stored graph that does not include grass, tree, or other nodes that do not correspond to structures or pavement. Generating the search graph prior to examining a graph for matches saves query processing time by narrowing the search space based upon readily-evaluated criteria, e.g. node type. The search graph also comprises a subset of the edges of the larger stored graph, where the edges included satisfy maximum distance limits and other constraints specified by the search template. These additional constraints may include spatial relationships, temporal relationships, and/or semantic relationships.

A graph search query can be defined in terms of a graph search template comprising nodes and edges corresponding to desired match result features. A graph search template need not define every attribute of a potential match. For example, a graph search template can comprise a plurality of nodes of defined node types (e.g., durable, ephemeral, or movable) and edges connecting one or more pairs of nodes in the nodes, but the template may leave undefined node attributes such as time and may not include all possible edges connecting the nodes. In the example, the graph search module 118 can return search query results that match the defined features of the search template while allowing undefined features to vary. Thus, search results identified by the graph search module 118 will match defined features of the search template, but the search results can also include additional features that do not conflict with the template's defined features.

Creation of a graph search template can be accomplished in many ways. In an example, a graphical user interface can be used to build the search template. In the example, visual representations of nodes and edges can be manipulated by a user in order to define a structure of a search template that defines characteristics of a desirable match result. In another example, a user can generate an input file that defines a template for a match result comprising a number of nodes, node types, node attributes, edge constraints between nodes, etc., and the file can be submitted to the graph search module 118.

Once the search graph template is defined, the graph search module 118 conducts a search over the full GTS graph of a search area in question for a subgraph matching the template criteria. The first step entails creating a search graph with just the candidate nodes matching the template criteria. For example, a search query template for the problem of identifying vehicles that stop in front of particular places of business can be defined as including only movable nodes and durable building nodes. The graph construction module 116 can construct a search graph for the example query by selecting the movable nodes and the durable building nodes of the full GTS graph for inclusion in the search graph, and building only those edges that connect the movable nodes and the durable building nodes thus included. The graph search module 118 can then apply various search techniques to the search graph based upon the search query defined by the user to identify portions of the full GTS graph that match the search template criteria. Graph search techniques can include techniques such as subgraph isomorphism analysis, or more computationally efficient techniques such as star graph searching or heterogeneous complex searching.

A GTS graph can be further modified to incorporate trajectory information with respect to objects in a scene that are mobile, such as vehicles. Such objects can be represented in the GTS graph by a single node assigned data indicative of the movable node attribute. Unlike durable or ephemeral nodes, movable nodes are associated with a plurality of locations over a period of time. A movable node can be assigned data indicating that the movable node corresponds to a trajectory, the trajectory comprising a plurality of locations each associated with a respective time. The computing device 102 can compute the trajectory based upon data received from the geolocation system 106, or the computing device 102 can receive the trajectory from the geolocation system 106 directly. For example, the computing device 102 can receive the trajectory directly as a series of time-stamped latitude-longitude coordinates for an object over a window of time. In another example, the computing device 102 can receive time and position information for a plurality of GPS satellites at a plurality of times, and can compute the trajectory of an object, comprising a series of time-stamped locations, based upon the time and position information for the plurality of GPS satellites. In general, geolocation data received from the geolocation system 106 need only contain sufficient information that a plurality of locations of an object and respective corresponding times be derivable from the data.

Figure 2:
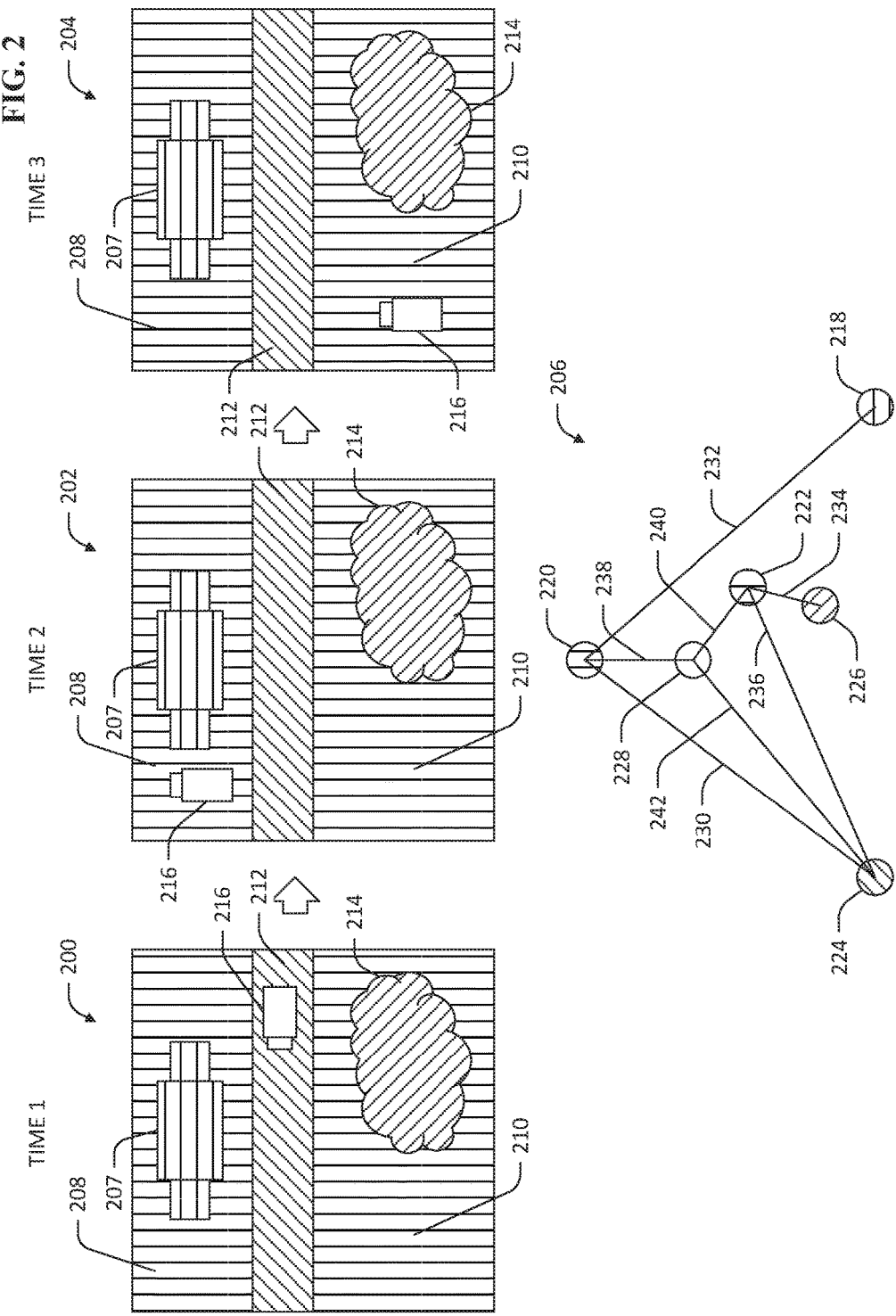
FIG. 2 is an illustration of an exemplary graph representation of a time series of remote sensing and geolocation data.

Referring now to FIG. 2, an exemplary scene at a first time 200, a second time 202, and a third time 204, and a corresponding partial graph representation 206 of the scene is shown. The scene includes a structure 207, two open grass fields 208-210, a road 212 dividing the fields 208-210, a tree 214 in the lower grass field 210, and a vehicle 216. In an alternative embodiment, the location of vehicle 216 is provided in separate images showing only the vehicle. In yet another embodiment, the locations of vehicle 216 are provided by a separate list of GPS positions. It is apparent that while the objects 207-214 have a fixed position in the scene through time 1, time 2, and time 3, the vehicle 216 moves from a first position on the road 212 to a second position on the field 208, to a final third position on the field 210. The structure 207, the fields 208-210, the road 212, and the tree 214 are all durable objects that ordinarily are persistent through time, in that they generally continue to exist and do not move absent interceding events (such as, for example, the tree 214 being cut down). These durable objects 207-214 are accordingly represented in the partial graph 206 by nodes 218-226, respectively, that are assigned data indicative of a "durable" attribute as described above. A node 228 that represents the vehicle 216, by contrast, is assigned a "movable" attribute since, while the vehicle itself is persistent through time, its position changes frequently. Accordingly, the node 228 is also associated with a trajectory comprising the first, second, and third positions of the vehicle 216, and a corresponding time associated with each of the first, second, and third positions. Note that in the example shown in FIG. 2, the location of vehicle 216 is evident in the scene images 200, 202, and 204. But scene images are not required to define a trajectory. For example, the trajectory of vehicle 216 might be specified by a separate list of GPS locations, indexed by time.

Edges 230-242 of the partial graph 206 represent adjacency relationships between the objects represented by the nodes 218-228. The edge 232, for example, represents that the grass field 208, represented by the node 220, is adjacent to the structure 207, represented by node 218. The edges 230-236 that connect the durable nodes 218-226 represent the adjacency relationship for as long as their respective connected nodes overlap in the time for which they exist, as defined by the time attribute for durable nodes described above. The edges 238-242 represent the adjacency relationships of durable nodes 220-224 with the movable node 228. While FIG. 2 uses undirected edges to represent adjacency relationships, the GTS graph and method may work with or without explicitly representing these adjacency relationships. For example, the undirected edges of the GTS graph can represent distance relationships rather than adjacency.

Since each movable node can be associated with multiple locations over a period of time, computation of a distance edge from a node to a movable node is defined with respect to a time period of interest and a duration of interest. By way of example, suppose a user submits a search query over a GTS graph to the graph search module 118 for movable nodes that represent objects that were within 100 meters of a first object represented by a first durable node for at least an hour between a first time $t_1$ and a second time $t_2$. The search query identifies the time period of interest $[t_1, t_2]$, the duration (one hour), and the minimum distance (100 meters). In the example, the search query can be a search graph template with a movable node, a durable node, and an edge that connects the movable node and the durable node and that is assigned data indicative of the time period and duration of interest and the minimum distance. The graph search module 118 causes the graph construction module 116 to construct a search graph comprising the movable nodes and the first durable node of the full GTS graph, and distance edges between each of the respective movable nodes and the first node. For any distance edge between a movable node and the first node, the graph construction module 116 can compute the distance between the movable node and the first node for each point in time in the period of time $[t_1, t_2]$ for which the trajectory of the movable node has a location. The graph construction module 116 can also compute the distance for every possible window of time within the period of time $[t_1, t_2]$ whose length is equal to the duration. The graph construction module 116 can assign data to the edge indicative of each window of time within $[t_1, t_2]$ of length greater than or equal to the duration where the distance between the objects is less than the specified minimum distance. Note that since the objects might be close together, then move further apart, then move close together again, etc, there may be multiple time windows satisfying this criterion. The graph construction module 116 can optionally identify some or all of these windows and include them in the search graph.

The above distance edge construction algorithm also can be applied if the first node is a movable node. In this case, both the first node and second node are movable nodes, and the locations of both nodes change with each point in time in the period of time $[t_1, t_2]$. The distance between the nodes can still be computed for each point in time after first computing the location of each node at that time, and the criterion can then be tested for each window of time.

A trajectory for a movable node may not have location information for every point in time. Thus, for some time periods and durations of interest, a trajectory associated with a particular movable node may have relatively many locations, relatively few locations, or perhaps no certain locations at all. Suppose, for example, that a movable node corresponds to a ship at sea. If the trajectory of the movable node is derived from AIS data gathered by coastal monitoring stations that track positions of ships, the trajectory can be expected to have a greater number of locations corresponding to times when the ship was near coasts than the number of locations corresponding to times when the ship was in open ocean (which may be zero, if the ship is out of range of the coastal monitoring stations). Therefore, in evaluating some search queries it may be desirable to infer additional locations of an object corresponding to a movable node when calculating distances for the purpose of computing distance edges.

The graph construction module 116, when computing distances, can compute inferred locations for a movable node based upon known locations in the node's trajectory. In one example, the graph construction module 116 can interpolate a straight line between a pair of consecutive locations in the trajectory. The graph construction module 116 can then compute a distance between a first node and the movable node for the span of time between the time of the first location in the pair and the time of the second location in the pair based upon a distance between the location of the first node and the interpolated line. In another example, the graph construction module 116 can compute an area of possible inferred locations between two known locations in the trajectory based upon a back projection of possible paths taken from each of a consecutive pair of locations. The projection of possible paths can depend on a speed or heading of the object represented by the movable node. The speed or the heading of the object can be computed or inferred based upon the locations and times in the trajectory, or the speed or the heading can be directly indicated in the geolocation data received by the computing device 102 from the geolocation system 106. Locations in the area can be used by the graph construction module 116 to compute an upper and lower bound on distance between the first node and the movable node during the span of time between the times corresponding to the locations in the pair of locations.

Geolocation data from which trajectories are derived can in some instances have irregular intervals or large gaps between locations that can make inferring locations between consecutive locations undesirable. For example, referring back to the example of a ship at sea, if the geolocation data comprises AIS location data from coastal tracking stations there may be many known locations while the ship is within range of coasts, but there may be no known locations at all while the ship is on the open ocean far from a coastline. Once on open ocean, the ship can travel any manner of paths through any number of locations, and it may be difficult or impossible to determine which of these is likely to be the ship's true path. Accordingly, the graph construction module 116 can partition a trajectory into a plurality of sub-trajectories each comprising a set of consecutive locations in the full trajectory. The graph construction module 116 can then infer locations for the object corresponding to the trajectory only within sub-trajectories. For example, a ship with a trajectory comprising locations along the coast of Spain and locations along the coast of Brazil can be partitioned into a first sub-trajectory comprising the locations along the coast of Spain and a second sub-trajectory comprising the locations along the coast of Brazil. In the example, the graph construction module 116 can infer locations based exclusively upon either the first sub-trajectory or the second sub-trajectory. Thus, the graph construction module 116 can infer additional locations of the ship along the coast of Brazil based on known locations of the ship along Brazil's coast, but would not infer locations between the Brazilian and Spanish coasts based upon a location near Spain and a location near Brazil. The trajectory can be partitioned into sub-trajectories based upon user input received at the computing device 102, or based upon known attributes of a movable node, such as its speed. For example, the graph construction module 116 might infer locations for a ship when its known locations are only an hour apart, but would not infer locations for a jet aircraft if its known locations were similarly an hour apart, since the speed and maneuverability of the aircraft makes inference of its location less likely to be accurate within an hour-long time frame.

The graph construction module 116 can also write trajectory search results back to the GTS graph. The graph search module 118 can search the GTS graph to identify portions of a trajectory matching query constraints. The graph construction module 116 can add a query match node to the GTS graph corresponding to the portions of the trajectory that match the query constraints. The query match node is assigned data indicative of nodes and edges that make up the match, as well as the query that resulted in the match. A query match node corresponding to a match that comprises a movable node can be further assigned data indicative of a reference trajectory. The reference trajectory comprises a pointer to a full trajectory of the movable node as well as a pair of points, or locations, bounding a subsection of the full trajectory that matches parameters of the search query. A first point in the pair of points identifies a beginning of a sequence of locations matching the search query parameters, while a second point in the pair of points identifies an ending of the sequence of locations, the sequence of locations being match locations. Since there might be multiple distinct time windows satisfying the distance criterion, the match node corresponding to a movable node may have multiple associated reference trajectories.

Reference trajectories can support further queries of the GTS graph via the graph search module 118. By way of an example, suppose a user wishes to query the GTS graph to identify ships that visited a United States port. The user can identify a query template comprising a movable node corresponding to a ship, a durable node corresponding to a port, and a distance edge defining a minimum distance constraint of less than 1 km. The graph search module 118 can then return match nodes corresponding to ship and port nodes that match the query distance constraint. The match nodes corresponding to ship nodes are assigned data indicative of respective reference trajectories. The reference trajectory of each match node comprises a pointer to the trajectory of the match node's corresponding ship node, as well as data indicative of the portion of the ship's trajectory for which the distance between the ship and the port was less than 1 km. Note that a match node may have multiple associated reference trajectories, indicating that the ship visited the port multiple times.

The graph construction module 116 can add the match nodes back to the full GTS graph, and the user can issue further queries to the graph search module 118 relative to the match nodes and their corresponding reference trajectories. For example, the user can define a query for ports that the matching ships came from prior to visiting the U.S. port by defining a search for ships in the matching ships that were within a distance of less than 1 km of a port in a time window prior to the first match point in a reference trajectory. The graph search module 118 can access a full trajectory of a ship in a match by way of the pointer in the reference trajectory, and can constrain the search to the time window based upon the time of the first match point in the reference trajectory. Reference trajectories therefore allow users of the system 100 to conduct follow-on queries from an original query to identify further features of interest with respect to objects and features comprising a match.

Figure 3:
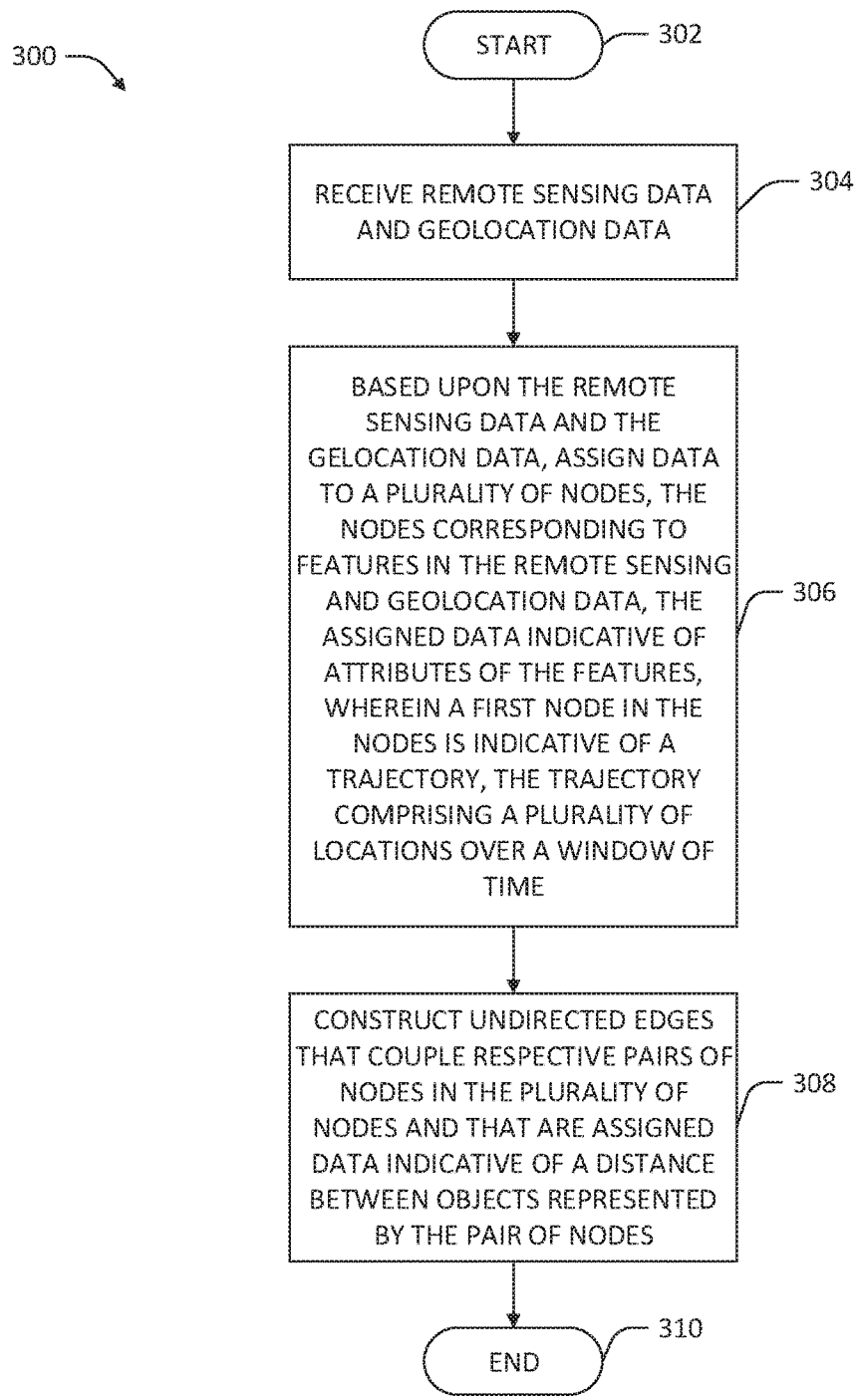
FIG. 3 is a flow diagram that illustrates an exemplary methodology for constructing a GTS graph based upon remote sensing and geolocation data sets.
Figure 4:
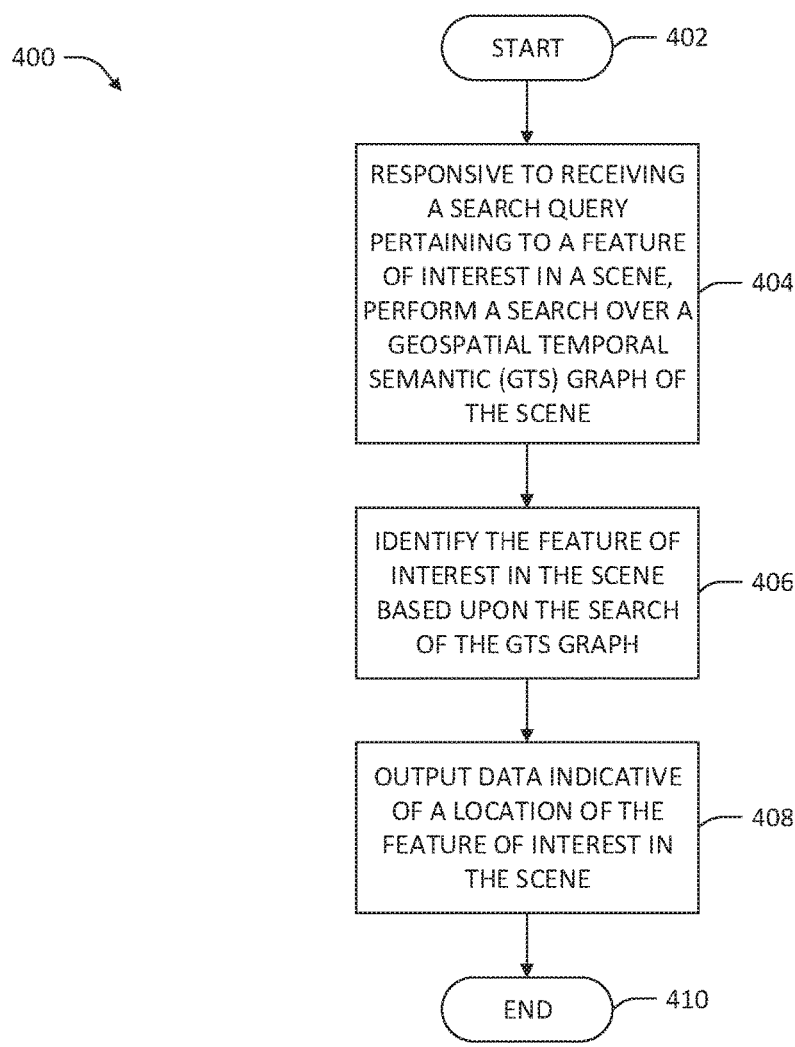
FIG. 4 is a flow diagram that illustrates an exemplary methodology for identifying features of interest in remote sensing and geolocation datasets by searching over a GTS graph representation of the datasets.

FIGS. 3-4 illustrate exemplary methodologies relating to identification and analysis of features of interest in geolocation and remote sensing data via searching over GTS graphs. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 3, a methodology 300 that facilitates constructing GTS graphs based upon geolocation and remote sensing data is illustrated. The methodology 300 begins at 302, and at 304 remote sensing data and geolocation data are received. As set forth above, the remote sensing data can be imagery generated by sensors such as SAR sensors, posterized images indicating a plurality of ground cover categories for regions in a scene, or other data from remote sensing sensors. At 306, data is assigned to a plurality of nodes based upon the remote sensing data and the geolocation data. The plurality of nodes are representative of objects and other features depicted in or described by the remote sensing data and the geolocation data, and the data assigned to the nodes is indicative of various attributes of the features. For example, a durable type node representing a building can be assigned data indicative of a height of the building, its street address, etc. Further, a first node in the nodes can be assigned data indicative of a trajectory that includes a plurality of locations over a window of time, for example when the first node represents a moving vehicle described by geolocation data. At 308, undirected edges are constructed that couple respective pairs of nodes in the plurality of nodes. The edges are assigned data indicative of a distance between objects represented by the pair of nodes. The methodology 300 then ends at 310.

Referring now to FIG. 4, a methodology 400 that facilitates searching GTS graphs responsive to receipt of search queries is illustrated. The methodology 400 begins at 402, and at 404, responsive to receiving a search query pertaining to a feature of interest in a scene, a search is performed over a GTS graph of the scene for the feature of interest. The GTS graph, as described in greater detail above, comprises nodes representing objects and other features depicted in or described by the remote sensing and geolocation data, and edges that couple respective pairs of nodes in the nodes and describe various relationships between the coupled nodes.

At least one node in the nodes can be representative of an object having a trajectory, and the at least one node can be assigned data indicative of the trajectory. At 406, the feature of interest in the scene is identified based upon the search of the GTS graph. Data indicative of a location of the feature of interest in the scene is output at 408, whereupon the methodology 400 ends at 410.

Figure 5:
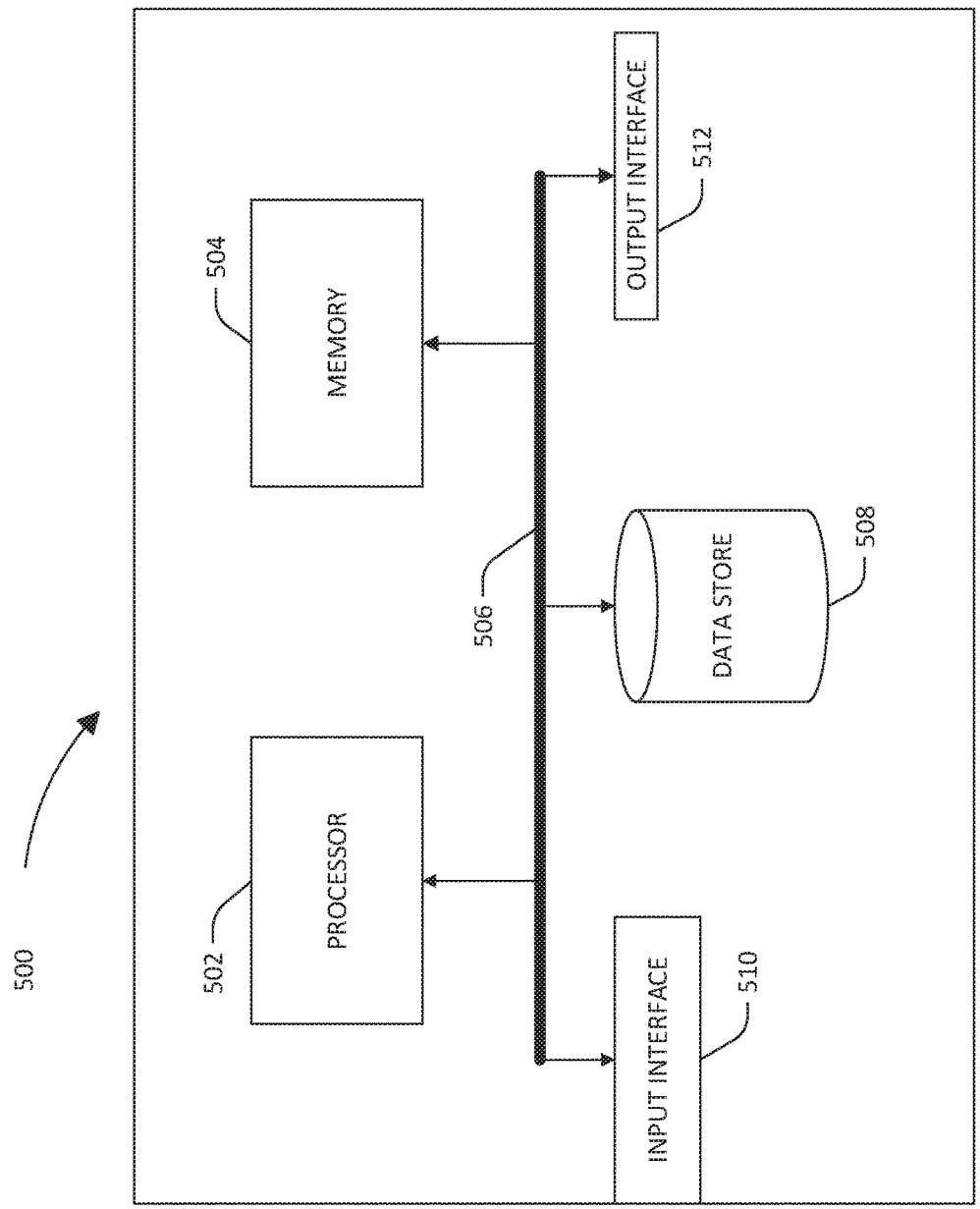
FIG. 5 is an exemplary computing system.

Referring now to FIG. 5, a high-level illustration of an exemplary computing device 500 that can be used in accordance with the systems and methodologies disclosed herein is illustrated. For instance, the computing device 500 may be used in a system that constructs GTS graphs based on remote sensing data and geolocation data. By way of another example, the computing device 500 can be used in a system that performs searches over GTS graphs responsive to receipt of search queries in order to identify features of interest in the remote sensing and geolocation data. The computing device 500 includes at least one processor 502 that executes instructions that are stored in a memory 504. The instructions may be, for instance, instructions for implementing functionality described as being carried out by one or more components discussed above or instructions for implementing one or more of the methods described above. The processor 502 may access the memory 504 by way of a system bus 506. In addition to storing executable instructions, the memory 504 may also store partial GTS graphs, search query results, prior search queries, etc.

The computing device 500 additionally includes a data store 508 that is accessible by the processor 502 by way of the system bus 506. The data store 508 may include executable instructions, remote sensing and geolocation data, stored graph representations of scenes, etc. The computing device 500 also includes an input interface 510 that allows external devices to communicate with the computing device 500. For instance, the input interface 510 may be used to receive instructions from an external computer device, from a user, etc. The computing device 500 also includes an output interface 512 that interfaces the computing device 500 with one or more external devices. For example, the computing device 500 may display text, images, etc. by way of the output interface 512.

It is contemplated that the external devices that communicate with the computing device 500 via the input interface 510 and the output interface 512 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 500 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 500 may be a distributed system. Thus, for instance, several devices may be in communication by way of a network connection and may collectively perform tasks described as being performed by the computing device 500.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A computing device, comprising:
   at least one processor; and
   memory comprising instructions that, when executed by the at least one processor, cause the at least one processor to perform acts comprising:
   based upon a remote sensing image of a scene and geolocation data, the geolocation data indicative of a plurality of locations of a first object over a window of time, constructing a geospatial temporal semantic (GTS) graph that is representative of objects in the scene, the objects in the scene include the first object, the GTS graph comprising:
nodes that represent the objects, wherein a first node in the nodes represents the first object, the first node assigned data that indicates that the first node corresponds to a trajectory, the trajectory comprising the locations of the first object over the window of time; and
undirected edges, wherein each undirected edge in the undirected edges couples a respective pair of nodes in the nodes, the undirected edge is assigned data that is indicative of a symmetric relationship between objects in the scene represented by nodes in the pair of nodes; and
providing the GTS graph to a search system, the GTS graph searchable in response to receipt of a query.

2. The computing device of claim 1, wherein the symmetric relationship between objects in the scene is a distance between the objects in the scene.

3. The computing device of claim 2, wherein a first undirected edge couples the first node and a second node in the nodes, the second node representing a second object, the first undirected edge assigned data that is indicative of a minimum distance between the first object and the second object over the window of time.

4. The computing device of claim 3, wherein the minimum distance is a minimum distance between the second object and the locations of the first object over the window of time.

5. The computing device of claim 3, wherein the minimum distance is a minimum distance between the second object and interpolated locations of the first object, the interpolated locations of the first object based upon the locations of the first object over the window of time.

6. The computing device of claim 5, wherein the interpolated locations are based upon the locations of the first object over the window of time and a heading of the first object.

7. The computing device of claim 5, wherein the data assigned to the first node indicates that the first node corresponds to a first trajectory and a second trajectory, the first trajectory comprising locations of the first object during a first window of time in the window of time, the second trajectory comprising locations of the first object during a second window of time in the window of time, wherein further each of the interpolated locations is based exclusively upon either the locations of the first object during the first window of time or the locations of the first object during the second window of time.

8. The computing device of claim 1, wherein the geolocation data comprises a plurality of timestamped latitude-longitude coordinate pairs.

9. The computing device of claim 1, wherein the data assigned to the first node indicates that the first node corresponds to a first trajectory and a second trajectory, the first trajectory comprising locations of the first object during a first window of time in the window of time, the second trajectory comprising locations of the first object during a second window of time in the window of time.

10. The computing device of claim 9, wherein the symmetric relationship between objects in the scene is a distance between the objects in the scene.

11. A method executed at a computing device, the method comprising:
responsive to receiving a search query pertaining to a feature of interest in a scene, performing a search over a geospatial temporal semantic (GTS) graph for the feature of interest, wherein the GTS graph comprises:
nodes that represent objects captured in at least one of remote sensing data corresponding to the scene or a geolocation dataset, the nodes comprising a first node representing a first object, the first node assigned data that indicates that the first node corresponds to a trajectory, the trajectory comprising locations of the first object over a window of time; and
undirected edges, wherein each undirected edge in the undirected edges couples a respective pair of nodes in the nodes, the undirected edge assigned data that is indicative of a symmetric relationship between objects in the scene represented by nodes in the pair of nodes;
identifying the feature of interest in the scene based upon the search of the GTS graph; and
outputting data indicative of a location of the feature of interest in the scene.

12. The method of claim 11, wherein the search query comprises a graph template, the graph template having characteristics comprising:
a first number of nodes of a first type;
a second number of nodes of a second type; and
a first number of edges connecting pairs of nodes;
wherein identifying the feature of interest in the scene comprises identifying a subgraph of the GTS graph matching the characteristics of the graph template.

13. The method of claim 12, wherein nodes of the first type correspond to respective trajectories, the characteristics of the graph template further comprising a first edge connecting a node of the first type and a node of the second type, the first edge assigned data indicative of a distance relationship between the node of the first type and the node of the second type over a first window of time in the window of time.

14. The method of claim 13, wherein the distance relationship comprises a minimum distance between the node of the first type and the node of the second type over the first window of time.

15. A computer-readable storage medium comprising instructions that, when executed by at least one processor, causes the at least one processor to perform acts comprising:
responsive to receiving a search query pertaining to at least one of an entity or activity of interest in a scene, performing a search over a geospatial temporal semantic (GTS) graph for the at least one of the entity or activity in the scene, wherein the GTS graph comprises:
nodes that represent objects captured in at least one of remote sensing data corresponding to the scene or a geolocation dataset, the nodes comprising a first node representing a first object, the first node assigned data that indicates that the first node corresponds to a trajectory, the trajectory comprising locations of the first object over a window of time; and
undirected edges, wherein each undirected edge in the undirected edges couples a respective pair of nodes in the nodes, the undirected edge assigned data that is indicative of a symmetric relationship between objects in the scene represented by nodes in the pair of nodes;
identifying a location of the at least one of the entity or activity in the scene based upon the search of the GTS graph; and outputting graphical data to a display indicating the location of the at least one of the entity or activity in the scene.

16. The computer-readable storage medium of claim 15, further comprising:
responsive to identifying the location of the at least one of the entity or activity in the scene, adding a second node to the GTS graph, the second node assigned data indicative of nodes and edges matching parameters of the search query.

17. The computer-readable storage medium of claim 15, wherein identifying the location of the at least one of the entity or activity in the scene comprises identifying match locations in the locations of the first object, the match locations matching parameters of the search query.

18. The computer-readable storage medium of claim 17, the acts further comprising:
responsive to identifying the match locations in the locations of the first object, adding a second node to the GTS graph, the second node assigned first data indicative of the match locations and second data indicative of the trajectory.

19. The computer-readable storage medium of claim 18, wherein the first data comprises a starting location and an ending location corresponding to the match locations.

20. The computer-readable storage medium of claim 15, wherein the search query comprises a graph search template.

* * * * *